US012786991B2

(12) United States Patent
He et al.

(10) Patent No.: US 12,786,991 B2
(45) Date of Patent: Nov. 3, 2026

(54) METHOD FOR TRANSMITTING DATA CHANNEL, TERMINAL DEVICE AND NETWORK DEVICE

(71) Applicant: GUANGDONG OPPO MOBILE TELECOMMUNICATIONS CORP., LTD., Dongguan (CN)

(72) Inventors: Chuanfeng He, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 380 days.

(21) Appl. No.: 18/361,765

(22) Filed: Jul. 28, 2023

(65) Prior Publication Data

US 2024/0023095 A1 Jan. 18, 2024

Related U.S. Application Data

(63) Continuation of application No. PCT/CN2021/078883, filed on Mar. 3, 2021.

(51) Int. Cl.

| | |
|---|---|
| ***H04W 72/1268*** | (2023.01) |
| ***H04W 72/0446*** | (2023.01) |
| ***H04W 74/0833*** | (2024.01) |
| *H04W 74/0836* | (2024.01) |

(52) U.S. Cl.

CPC ... *H04W 72/1268* (2013.01); *H04W 72/0446* (2013.01); *H04W 74/0833* (2013.01); *H04W 74/0836* (2024.01)

(58) Field of Classification Search

CPC ......... H04W 72/1268; H04W 72/0446; H04W 74/0833; H04W 74/0836

See application file for complete search history.

(56) References Cited

U.S. PATENT DOCUMENTS

| | | | | |
|---|---|---|---|---|
| 12,464,516 | B2 * | 11/2025 | Panteleev | H04L 5/0053 |
| 2015/0016312 | A1 * | 1/2015 | Li | H04L 5/14 370/280 |
| 2019/0274138 | A1 | 9/2019 | Zhang et al. | |
| 2019/0289638 | A1 * | 9/2019 | Kung | H04L 1/1812 |
| 2020/0059390 | A1 * | 2/2020 | Zhang | H04B 1/713 |

(Continued)

FOREIGN PATENT DOCUMENTS

| | | |
|---|---|---|
| CN | 112040558 | 12/2020 |
| EP | 3780871 | 2/2021 |

OTHER PUBLICATIONS

ZTE Corporation, "Discussion on support of Type A PUSCH repetitions for Msg3," 3GPP TSG RAN WG1 #104-e, R1-2100099, Jan. 2021.

(Continued)

*Primary Examiner* — Jael M Ulysse

(74) *Attorney, Agent, or Firm* — Hodgson Russ LLP

(57) ABSTRACT

A method for transmitting a data channel, a terminal device and a network device. The method comprises: a terminal device determines information about the number of repeated transmissions of a physical uplink shared channel (PUSCH) according to the PUSCH public configuration information or a time domain resource allocation list, wherein the PUSCH is used for carrying a third message in the random access process.

8 Claims, 3 Drawing Sheets

(56) References Cited

U.S. PATENT DOCUMENTS

| | | | | |
|---|---|---|---|---|
| 2021/0014011 | A1* | 1/2021 | Xiong | H04L 1/1819 |
| 2021/0058971 | A1* | 2/2021 | MolavianJazi | H04L 1/08 |
| 2021/0076384 | A1* | 3/2021 | MolavianJazi | H04B 17/328 |
| 2021/0251016 | A1* | 8/2021 | Xiong | H04L 1/0041 |
| 2021/0266978 | A1* | 8/2021 | Sakhnini | H04W 74/0833 |
| 2021/0337625 | A1* | 10/2021 | Tsai | H04W 56/001 |
| 2021/0352712 | A1* | 11/2021 | Ly | H04L 1/1819 |
| 2021/0360660 | A1* | 11/2021 | Cozzo | H04L 1/1887 |
| 2021/0392679 | A1* | 12/2021 | Kim | H04L 1/189 |
| 2021/0410192 | A1* | 12/2021 | Ly | H04W 72/21 |
| 2022/0086896 | A1* | 3/2022 | Takahashi | H04W 72/1268 |
| 2022/0150984 | A1* | 5/2022 | Taherzadeh Boroujeni | H04L 1/08 |
| 2022/0159742 | A1* | 5/2022 | Xu | H04B 17/328 |
| 2022/0210806 | A1* | 6/2022 | Rastegardoost | H04B 7/0628 |
| 2022/0240323 | A1* | 7/2022 | Taherzadeh Boroujeni | H04W 74/0833 |
| 2022/0287061 | A1* | 9/2022 | Huang | H04L 1/1822 |
| 2022/0377766 | A1* | 11/2022 | Karaki | H04L 1/1864 |
| 2022/0377767 | A1* | 11/2022 | Ying | H04L 1/1887 |
| 2023/0053082 | A1* | 2/2023 | Cozzo | H04L 1/1887 |
| 2023/0156782 | A1* | 5/2023 | Li | H04L 1/08 370/329 |
| 2023/0389082 | A1* | 11/2023 | Echigo | H04L 1/08 |
| 2024/0215015 | A1* | 6/2024 | Su | H04L 1/08 |
| 2024/0430930 | A1* | 12/2024 | Kim | H04W 72/23 |

OTHER PUBLICATIONS

EPO, Extended Eurpoean Search Report for EP Application No. 21928495.7, Jan. 25, 2024.

Xiaomi, “Discussion on Type A PUSCH repetition for Msg3,” 3GPP TSG RAN WG1 #104-e, R1-2101130, Jan. 2021.

ETRI, “PUSCH coverage enhancement,” 3GPP TSG RAN WG1 #104-e, R1-2101082, Jan. 2021.

WIPO, International Search Report and Written Opinion for PCT/CN2021/078883, Jul. 19, 2021.

“3rd Generation Partnership Project; Technical Specification Group Radio Access Network; NR; Physical layer procedures for control (Release 16),” 3GPP TS 38.213, Jun. 2020, v16.2.0.

“3rd Generation Partnership Project; Technical Specification Group Radio Access Network; NR; Physical layer procedures for data (Release 16),” 3GPP TS 38.214, Jun. 2020, v16.2.0.

* cited by examiner

METHOD FOR TRANSMITTING DATA CHANNEL, TERMINAL DEVICE AND NETWORK DEVICE

CROSS REFERENCE

The present application is a continuation of International Application No. PCT/CN2021/078883, filed Mar. 3, 2021, the entire disclosure of which is incorporated herein by reference.

TECHNICAL FIELD

The embodiment of the present disclosure relates to the communication field, and in particular to a method for transmitting data channel, a terminal device, and a network device.

BACKGROUND

In the New Radio (NR) system, in order to support ultra-reliable and low latency communication (URLLC) services, repeated transmission of uplink data is used to improve transmission reliability.

In the NR system, a four-step random access process is supported, specifically including the sending process of message 1 (Msg1)-message 4 (Msg4). The message 3 (Msg3) is carried by the Physical Uplink Shared Channel (PUSCH).

SUMMARY

The present application provides a method for data channel transmission, a terminal device and a network device.

In a first aspect, a method for data channel transmission is provided, including: a terminal device determines information on a number of repeated transmission times of the PUSCH according to public configuration information of a physical uplink shared channel PUSCH or a time domain resource allocation list, wherein the PUSCH It is used to carry a third message in a random access process.

In a second aspect, a method for transmitting a data channel is provided, including: a network device, configures information on a number of repeated transmission times of a physical uplink shared channel PUSCH for a terminal device, according to PUSCH common configuration information or a time domain resource allocation list, wherein the PUSCH is used to carry a third message in a random access process.

In a third aspect, a terminal device is provided, configured to execute the method in the foregoing first aspect or various implementation manners thereof.

Specifically, the terminal device includes a functional module for executing the method in the above first aspect or its various implementation manners.

In a fourth aspect, a network device is provided, configured to execute the method in the foregoing second aspect or various implementation manners thereof.

Specifically, the network device includes a functional module for executing the method in the above second aspect or each implementation manner thereof.

In a fifth aspect, a terminal device is provided, including a processor and a memory. The memory is used to store a computer program, and the processor is used to call and run the computer program stored in the memory to execute the method in the above first aspect or its various implementations.

In a sixth aspect, a network device is provided, including a processor and a memory. The memory is used to store a computer program, and the processor is used to call and run the computer program stored in the memory to execute the method in the above second aspect or its various implementations.

In a seventh aspect, a chip is provided for implementing the method in any one of the above first aspect to the second aspect or their various implementations.

Specifically, the chip includes: a processor, configured to call and run a computer program from a memory, so that the device installed with the chip execute the method in any one of the above first aspect to the second aspect or their various implementations.

In an eighth aspect, there is provided a computer-readable storage medium for storing a computer program, and the computer program causes a computer to execute the method in any one of the above first aspect to the second aspect or their various implementations.

In a ninth aspect, a computer program product is provided, including computer program instructions, the computer program instructions cause a computer to execute the method in any one of the above first aspect to the second aspect or their various implementations.

In a tenth aspect, a computer program is provided, which, when running on a computer, causes the computer to execute the method in any one of the above first aspect to the second aspect or their various implementations.

DETAILED DESCRIPTION

Figure 1:
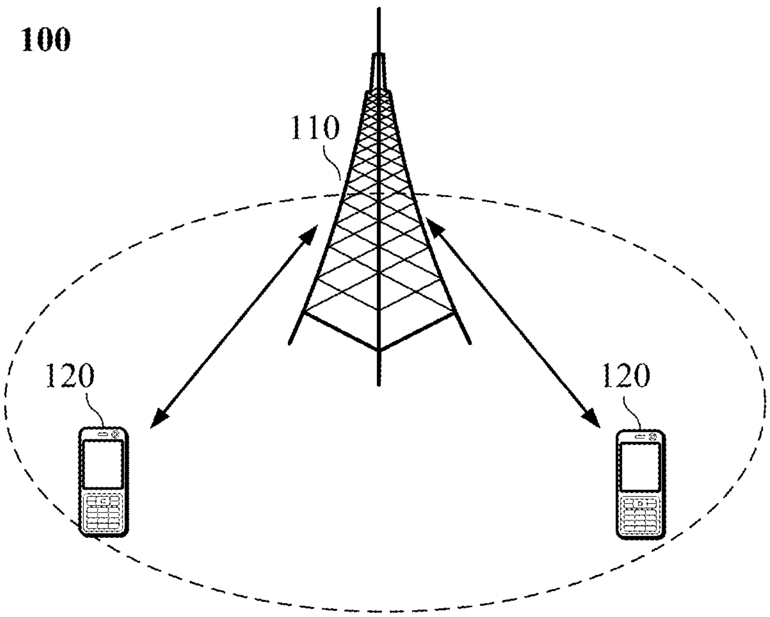
FIG. 1 is a schematic diagram of a communication system architecture provided by an embodiment of the present application.

Hereinafter, the technical solutions in the embodiments of the present application will be described with reference to the drawings in the embodiments of the present application. Obviously, the described embodiments are part of the embodiments of the present application, but not all of the embodiments. With regard to the embodiments in this application, all other embodiments obtained by persons of ordinary skill in the art without making creative efforts belong to the scope of protection of this application.

The technical solutions of the embodiments of the present application can be applied to various communication systems, for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, LTE-based access to unlicensed spectrum, (LTE-U) system, NR-based access to unlicensed spectrum (NR-U) system, Non-Terrestrial Networks (NTN) system, Universal Mobile Telecommunications System (UMTS), Wireless Local Area Networks (WLAN), Wireless Fidelity (WiFi), fifth-generation communication (5th-Generation, 5G) system or other communication systems, etc.

Generally speaking, the number of connections supported by traditional communication systems is limited and easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., the embodiments of the present application may also be applied to these communication systems.

Optionally, the communication system in the embodiment of the present application can be applied to a carrier aggregation (CA) scenario, a dual connectivity (DC) scenario, or a standalone (SA) deployment scene.

Optionally, the communication system in the embodiment of the present application may be applied to an unlicensed spectrum, wherein the unlicensed spectrum may also be considered as a shared spectrum; or, the communication system in the embodiment of the present application may also be applied to a licensed spectrum, wherein, the licensed spectrum can also be considered as non-shared spectrum.

The embodiments of the present application describe various embodiments in conjunction with network device and terminal device, wherein the terminal device may also be referred to as user equipment (UE), access terminal, user unit, user station, mobile station, mobile site, remote station, remote terminal, mobile device, user terminal, terminal, wireless communication device, user agent or user device, etc.

The terminal device can be a station (ST) in a WLAN, a cellular phone, a cordless phone, a Session Initiation Protocol (SIP) phone, a Wireless Local Loop (WLL) station, a Personal Digital Assistant (PDA) device, handheld devices with wireless communication functions, computing devices or other processing devices connected to wireless modems, vehicle-mounted devices, wearable devices, next-generation communication systems such as terminal devices in NR networks, or the terminal device in a future evolved public land mobile network (PLMN) network, etc.

In the embodiment of this application, the terminal device can be deployed on land, including indoor or outdoor, handheld, wearable or vehicle-mounted; the terminal device can also be deployed on water (such as ships, etc.); the terminal device can also be deployed in the air (such as aircraft, balloons and satellites).

In this embodiment of the application, the terminal device may be a mobile phone, a tablet computer (Pad), a computer with a wireless transceiver function, a virtual reality (VR) terminal device, an augmented reality (AR) terminal device, wireless terminal devices in industrial control, wireless terminal devices in self driving, wireless terminal devices in remote medical, wireless terminal devices in smart grid, wireless terminal device in transportation safety, wireless terminal device in smart city, or wireless terminal device in smart home.

As an example but not a limitation, in this embodiment of the present application, the terminal device may also be a wearable device. Wearable devices can also be called wearable smart devices, which is a general term for the application of wearable technology to intelligently design daily wear and develop wearable devices, such as glasses, gloves, watches, clothing and shoes. A wearable device is a portable device that is worn directly on the body or integrated into the user's clothing or accessories. Wearable devices are not only a hardware device, but also achieve powerful functions through software support, data interaction, and cloud interaction. Generalized wearable smart devices include those of full-featured, large-sized, complete or partial functions without relying on smart phones, such as smart watches or smart glasses, etc., and those only focus on a certain type of application functions, and need to cooperate with other devices such as smart phones, such as various smart bracelets and smart jewelry for physical sign monitoring.

In the embodiment of this application, the network device may be a device used to communicate with mobile devices, and the network device may be an access point (AP) in WLAN, a base transceiver station (BTS) in GSM or CDMA, or a base station (NodeB, NB) in WCDMA, or an evolved base station (Evolutional Node B, eNB or eNodeB) in LTE, or a relay station or an access point, or a vehicle-mounted device, a wearable device, and a network device (gNB) in an NR network, or the network device in the future evolution of the PLMN network or the network device in the NTN network, etc.

As an example but not a limitation, in this embodiment of the present application, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station installed on land, water, and other locations.

In this embodiment of the application, the network device may provide services for a cell, and the terminal device communicates with the network device through the transmission resources (for example, frequency domain resources, or spectrum resources) used by the cell. The cell may be a cell corresponding to a network device (e.g., a base station), the cell may belong to a macro base station, or a base station corresponding to a small cell, wherein the small cell may include: Metro cell, Micro cell, Pico cell, Femto cell, etc. These small cells have the characteristics of small coverage and low transmission power, and are suitable for providing high-speed data transmission services.

Exemplarily, a communication system 100 applied in this embodiment of the application is shown in FIG. 1. The communication system 100 may include a network device 110, and the network device 110 may be a device for communicating with a terminal device 120 (or called a communication terminal, terminal). The network device 110 can provide communication coverage for a specific geographical area, and can communicate with terminal devices located in the coverage area.

FIG. 1 exemplarily shows one network device and two terminal devices. Optionally, the communication system 100 may include multiple network devices and each network device may include other numbers of terminal devices within the coverage area, which is not limited by the embodiment of the application.

Optionally, the communication system 100 may further include other network entities such as a network controller and a mobility management entity, which is not limited in this embodiment of the present application.

It should be understood that a device with a communication function in the network/system in the embodiment of the present application may be referred to as a communication device. Taking the communication system 100 shown in FIG. 1 as an example, the communication equipment may include network device 110 and terminal device 120 with communication functions, which may be the specific devices discussed above and will not be repeated herein. The communication equipment may include other devices in the communication system 100, such as network controllers, mobility management entities and other network entities, which are not limited in this embodiment of the present application.

It should be understood that the terms “system” and “network” are often used interchangeably herein. The term “and/or” in this article is just an association relationship describing associated objects, which means that there can be three relationships, for example, A and/or B can mean these three situations: A exists alone, A and B exist simultaneously, and B exists alone. In addition, the character “/” in this article generally indicates that the contextual objects are an “or” relationship.

It should be understood that the “indication” mentioned in the embodiments of the present application may be a direct indication, may also be an indirect indication, and may also mean that there is an association relationship. For example, A indicates B, which can mean that A directly indicates B, for example, B can be obtained through A; it can also indicate that A indirectly indicates B, for example, A indicates C, and B can be obtained through C; it can also indicate that there is an association relation between A and B.

In the description of the embodiments of the present application, the term “corresponding” may indicate that there is a direct or indirect correspondence between the two, or that there is an association between the two, or the relation of indicating and being indicated, configuring and being configured, or the like.

In the embodiment of this application, “predefined” can be realized by pre-saving corresponding codes, tables or other means that can be used to indicate related information in the device (for example, including the terminal device and the network device). The implementation method is not limited. For example, pre-defined may refer to being defined in the protocol.

In the embodiment of the present application, the “protocol” may refer to a standard protocol in the communication field, for example, it may include the LTE protocol, the NR protocol, and related protocols applied in future communication systems, which is not limited in the present application.

In order to facilitate understanding of the technical solutions of the embodiments of the present application, the technical solutions of the present application are described in detail below through specific examples. The following related technologies may be optionally combined with the technical solutions of the embodiments of the present application as optional solutions, and all of them belong to the protection scope of the embodiments of the present application. The embodiment of the present application includes at least part of the following contents.

In the NR system, the network device sends an uplink grant (UL grant), the UL grant is carried in the downlink control information (DCI), the DCI is DCI (format) format 0_0, or DCI format 0_1, scheduling the transmission of the physical uplink shared channel (PUSCH).

When the network device schedules the uplink data transmission through the DCI bearing the UL grant, it will carry a Time Domain Resource Allocation (TDRA) field in the DCI. The TDRA field is 4 bits and can indicate 16 different rows in a time domain resource allocation table. Each row contains different resource allocation combinations, such as the starting position S of the PUSCH, the length L, k2, and different mapping types, etc. Wherein, k2 represents the number of slots offset between the time slot where the DCI is located and the slot where the PUSCH is located. The types of PUSCH time domain resource allocation include type A (Type A) and type B (Type B). The difference between Type A and Type B lies in that the ranges of the corresponding S and L candidate values are different. Wherein, Type A is mainly for slot-based services, S is relatively ahead, and L is relatively long. Type B is mainly for ultra-reliable and low latency communication (URLLC), L is relatively short, and it can reduce transmission delay. The optional value ranges of S and L are shown in Table 1 below.

TABLE 1

| PUSCH | Normal cyclic prefix | | | Extended cyclic prefix | | |
|---|---|---|---|---|---|---|
| type | S | L | S + L | S | L | S + L |
| Type A | 0 | {4, . . . , 14} | {4, . . . , 14} (only for repetition (repetition) Type A) | 0 | {4, . . . , 12} | {4, . . . , 12} |
| Type B | {0, . . . , 13} | {1, . . . , 14} | {1, . . . , 14} (for repeating Type A), {1, . . . , 27} (for repeating Type B) | {0, . . . , 11} | {1, . . . , 12} | {1, . . . , 12} |

In addition to the above time domain resource allocation information, the DCI carrying the UL grant also includes frequency domain resource information, modulation and coding scheme (MCS), transmission power control (TPC), frequency hopping information, redundant version, Hybrid Automatic Repeat reQuest (HARQ) process number, etc., which will not be described here.

Figure 2:
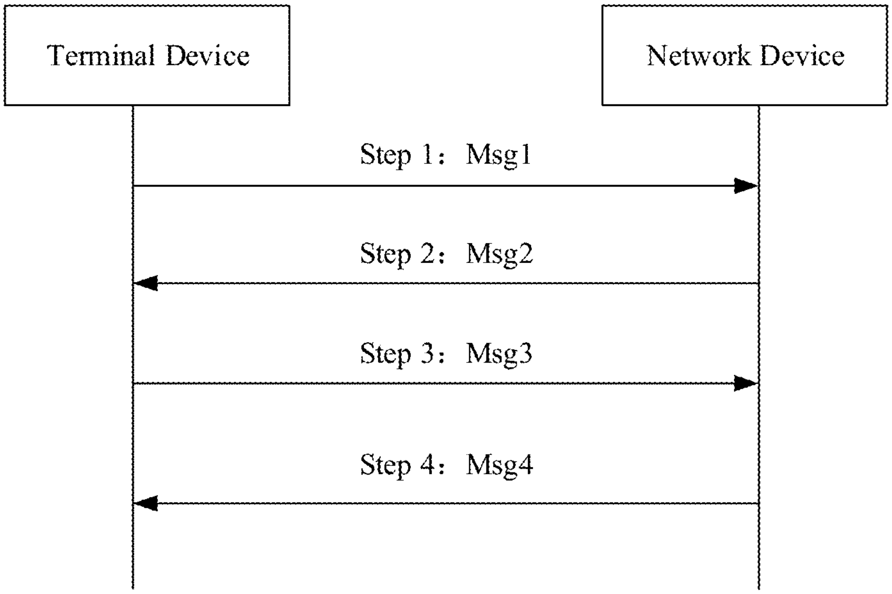
FIG. 2 is a schematic diagram of a four-step random access process.

In the NR system, a four-step random access process is supported, specifically including the sending process of message 1 (Msg1)-message 4 (Msg4). As an example, as shown in FIG. 2, the four-step random access process includes the following steps:

In step 1, the terminal device sends a random access preamble (Preamble, that is, Msg 1) to the network device.

In the embodiment, the random access preamble may also be referred to as a preamble, a random access preamble sequence, a preamble sequence, and the like.

Specifically, the terminal device may select physical random access channel (PRACH) resources, and the PRACH resources may include time domain resources, frequency domain resources, and code domain resources. The network device sends random access related parameters to the terminal device through the broadcast system information block (SIB) 1, in which in the random access common configuration information element (RACH-ConfigCommon IE), the reference signal receiving power (RSRP) threshold (rsrp-ThresholdSSB) for the synchronization signal block (SSB) is used for the terminal device to select the SSB. The terminal device compares the RSRP measurement results under each SSB with the rsrp-ThresholdSSB, and selects the SSB having the measurement value higher than the configured threshold value for access, and if there is no SSB meeting the configured threshold value, one of all SSBs is randomly selected for access. Each SSB corresponds to a set of random access preamble (Preamble) resources and random access occasion (RACH Occasion, RO) resources, and the terminal device randomly selects from the contention-based random access resources in the selected SSB, configures the Preamble index (PREAMBLE INDEX) to the selected random access Preamble. The network device can estimate the transmission delay between itself and the terminal device according to the Preamble and use this to calibrate the uplink timing, and can generally determine the resource size required by the terminal device to transmit Msg 3. In order for the network device to know the size of the Msg 3 to be transmitted more accurately and allocate appropriate uplink resources, the Preamble is classified into Preamble group A and Preamble group B. If Preamble group B exists in the random access resources, the terminal device can select the Preamble group according to the size of Msg 3 and the path loss.

Step 2, the network device sends a random access response (RAR, or Msg 2) to the terminal device.

After the terminal device sends the Preamble to the network device, a random access response window (ra-ResponseWindow) may be opened, and the corresponding physical downlink control channel (PDCCH) is detected according to the random access radio network temporary identifier (RA-RNTI) in the ra-ResponseWindow. If the terminal device detects the PDCCH scrambled by the RA-RNTI, the terminal device can obtain a physical downlink shared channel (PDSCH) scheduled by the PDCCH. In the embodiment, the PDSCH includes the RAR corresponding to the Preamble.

The RA-RNTI is calculated based on the time-frequency position of the PRACH that sends the Preamble, so if multiple terminal devices send the Preamble on the same RO, the corresponding RARs are multiplexed in the same RAR media access control protocol data unit (MAC PDU). If the terminal successfully receives the PDCCH scrambled by the RA-RNTI corresponding to the RO resource that sent the Preamble, and the RAR contains a MAC subPDU (subPDU) carrying a random access preamble identifier (RAPID) corresponding to the PREAMBLE INDEX selected in Msg 1, the RAR reception is successful, and the terminal can decode the timing advance command (TAC), uplink grant resource (UL Grant) and temporary cell radio network temporary identity (TC-RNTI), and proceed to Msg 3.

If the PDCCH scrambled by the RA-RNTI corresponding to the RO resource for sending Preamble is not received during the operation of ra-ResponseWindow, or the PDCCH scrambled by the RA-RNTI is received, but the RAR does not include the MAC subPDU corresponding to PREAMBLE INDEX, the RAR reception is considered as being failed in these two cases. At this time, if the number of transmissions of the Preamble does not exceed the maximum number of transmissions configured by the network (preambleTransMax), the terminal device needs to retransmit Msg 1. If the number of transmissions of the Preamble exceeds the maximum number of transmissions configured by the network (preambleTransMax), the terminal device reports the random access problem to the upper layer.

Step 3, the terminal device sends Msg 3.

After receiving the RAR message, the terminal device judges whether the RAR is its own RAR message. For example, the terminal device can use the preamble index to check. After determining that it is its own RAR message, it can generate the Msg 3 at the RRC layer, and send the Msg 3 to the network device, which needs to carry the identification information of the terminal device and so on.

In the embodiment, the Msg 3 is mainly used to notify the network device of the random access trigger event. For different random access trigger events, the Msg 3 sent by the terminal device in step 3 may include different content.

For example, for the initial access scenario, the Msg 3 may include an RRC connection request message (RRC Setup Request) generated by the RRC layer. In addition, the Msg 3 may also carry, for example, a 5G-serving temporary mobile subscriber identity (S-TMSI) or a random number of the terminal device.

For another example, for an RRC connection reestablishment scenario, the Msg 3 may include an RRC connection reestablishment request message (RRC Reestablishment Request) generated by the RRC layer. In addition, the Msg 3 may also carry, for example, a cell radio network temporary identifier (C-RNTI) and the like.

For another example, for the handover scenario, the Msg 3 may include an RRC handover confirmation message (RRC Handover Confirm) generated by the RRC layer, which carries the C-RNTI of the terminal device. In addition, the Msg 3 may also carry information such as a buffer status report (BSR). For other trigger events such as the arrival of uplink/downlink data, the Msg 3 may at least include the C-RNTI of the terminal device.

Step 4, the network device sends a contention resolution message (contention resolution), i.e., the Msg 4, to the terminal device.

The network device sends the Msg 4 to the terminal device, and the terminal device correctly receives the Msg 4 to complete contention resolution. For example, during the RRC connection establishment process, the Msg 4 may carry the RRC connection establishment message.

In the embodiment, the message 3 (Msg3) is carried by the physical uplink shared channel (PUSCH), the RAR in the Msg2 carries the UL grant of the PUSCH used for the initial transmission of the Msg3, and the UL grant carried in the RAR is referred to as the RAR UL grant. The information carried by the RAR UL grant information may include PUSCH time domain and frequency domain resource allocation information, transmission power control TPC, frequency hopping, and MCS, etc.

If the network device does not receive the Msg3 correctly, it will indicate the retransmission scheduling information of the Msg3 through DCI, for example, carried by the DCI format 0_0 scrambled by the temporary cell radio network temporary identity (TC-RNTI). In addition to the content contained in the RAR UL grant, it also includes new data indicator (NDI), redundancy version, and HARQ process number.

In the NR system, in order to support ultra-reliable and low latency communication (URLLC) services, repeated transmission of uplink data is used to improve transmission reliability. Therefore, how to realize the repetition transmission of the PUSCH carrying the Msg 3 to improve the transmission reliability of the Msg 3 is an urgent problem to be solved.

Figure 3:
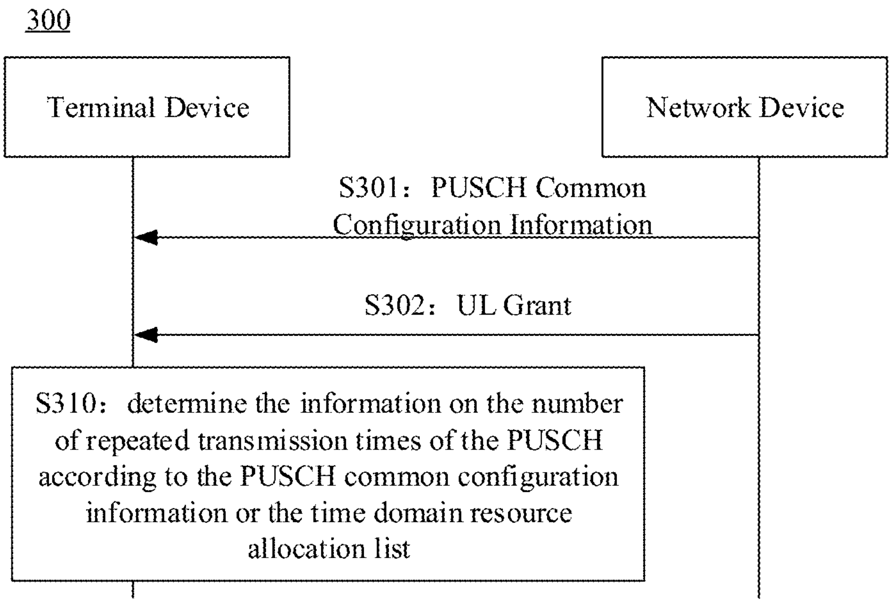
FIG. 3 is a schematic interaction diagram of a method for data channel transmission according to an embodiment of the present application.

FIG. 3 is a schematic interaction diagram of a method 300 for transmitting a data channel according to an embodiment of the present application. As shown in FIG. 3, the method 300 includes at least part of the following content:

S310, the terminal device determines the information on the number of repeated transmission times of the PUSCH according to the common configuration information of the physical uplink shared channel PUSCH or the time domain resource allocation list, wherein the PUSCH is used to carry the third message in the random access process (i.e., Msg3).

In this embodiment of the present application, the PUSCH used to carry Msg3 may also be referred to as Msg3 PUSCH.

In some embodiments, the method 300 may also include:

S301, the terminal device receives the PUSCH common configuration information (pusch-ConfigCommon) sent by the network device.

In some embodiments of the present application, the PUSCH common configuration information is used to carry information about the number of repeated transmission times of the PUSCH.

In this embodiment of the present application, the PUSCH common configuration information is sent through a system message.

In some embodiments, the information on the number of repeated transmission times of the Msg3 PUSCH may include the information on the number of repeated transmission times used for the initial transmission of the Msg3 PUSCH, and/or the information on the number of repeated transmission times used for the retransmission of the Msg3 PUSCH.

Optionally, the information on the number of repeated transmission times used for the initial transmission of the Msg3 PUSCH and the information on the number of repeated transmission times used for the retransmission of the Msg3 PUSCH may be the same, or may also be different.

In some embodiments, the PUSCH common configuration information includes a first repeated transmission number information set, and the first repeated transmission number set may include at least one piece of number of repeated transmission times information for the Msg3 PUSCH transmission.

Optionally, the first repeated transmission number information set may be used for the initial transmission and retransmission of the Msg3 PUSCH.

In some embodiments, if the first repeated transmission number information set includes multiple numbers of repeated transmission times, the network device may indicate to the terminal device the target information on the number of repeated transmission times in the first repeated transmission number information set. For example, the target information on the number of repeated transmission times is indicated by the means of a bitmap, and the specific indication manner will be described in detail below.

In some other embodiments, the PUSCH common configuration information includes a second repeated transmission number information set and a third repeated transmission number information set, and the second repeated transmission number set includes at least one information on the number of repeated transmission times for Msg3 PUSCH initial transmission, the third repeated transmission number set includes at least one information on the number of repeated transmission times for Msg3 PUSCH retransmission.

Optionally, if the second repeated transmission number set includes multiple numbers of repeated transmission times, in the initial transmission scenario of PUSCH, the network device may indicate to the terminal device the target information on the number of repeated transmission times in the second repeated transmission number set. For example, the target information on the number of repeated transmission times is indicated by the means of a bitmap, and the specific indication manner will be described in detail below.

Optionally, if the third repeated transmission number set includes multiple numbers of repeated transmission times, in the retransmission scenario of PUSCH, the network device may indicate to the terminal device the target information on the number of repeated transmission times in the third repeated transmission number set. For example, the target information on the number of repeated transmission times is indicated by the means of a bitmap, and the specific indication manner will be described in detail below.

It should be understood that the embodiment of the present application is also applicable to determining the number of repeated transmissions of the PUSCH used to carry other messages. For example, the number of repeated transmissions of the PUSCH used to carry MsgA, wherein the MsgA is the first message of contention-based two-step random access, in this case, the PUSCH can be called MsgA PUSCH, the information on the number of repeated transmission times of the MsgA PUSCH can be configured through the MsgA common configuration information. The specific configuration method is implemented by referring to the relevant implementation of configuring the information on the number of repeated transmission times of the Msg3 PUSCH through the PUSCH common configuration information.

In some embodiments of the present application, the PUSCH common configuration information includes an information element (IE) of PUSCH time domain resource allocation list, and the Msg3 PUSCH information on the number of repeated transmission times is included in the PUSCH time domain resource allocation list IE.

In some embodiments, the PUSCH time domain resource allocation list IE includes multiple time domain resource allocation configurations, and each time domain resource allocation configuration includes a set of time domain resource allocation information and information on the number of repeated transmission times of the PUSCH.

Optionally, each set of time domain resource allocation information may include at least one of the following information:

k2, the mapping type, start symbol, and length of the PUSCH, wherein the k2 represents the number of slots offset between the time slot where the signaling for scheduling the PUSCH is located and the slot where the PUSCH is located.

In some embodiments, each time domain resource allocation configuration includes one piece of information on the number of repeated transmission times, and the one piece of information on the number of repeated transmission times is used for the initial transmission and retransmission of the PUSCH.

In some other embodiments, each time domain resource allocation configuration includes two pieces of information on the number of repeated transmission times, and the two pieces of information on the number of repeated transmission times are respectively used for the initial transmission and retransmission of the PUSCH.

In some embodiments, the PUSCH time domain resource allocation list IE may reuse an existing IE, for example, PUSCH-TimeDomainResourceAllocationList-r16, or may also be a newly defined IE, such as PUSCH-TimeDomainResourceAllocationList-r17.

For example, PUSCH-TimeDomainResourceAllocationList-r16 may include information such as k2, PUSCH mapping type, start symbol, length, and number of repeated transmission times.

As an example, PUSCH-TimeDomainResourceAllocationList-r16 is defined as follows:

```
PUSCH-TimeDomainResourceAllocationList-r 16:: = SEQUENCE
(SIZE(1..maxNrofUL-Allocations-r16)) OF PUSCH-
TimeDomainResourceAllocation-r16
PUSCH-TimeDomainResourceAllocation-r 16::= SEQUENCE {
k2-r16 INTEGER(0..32) OPTIONAL, -- Need S
puschAllocationList-r16 SEQUENCE (SIZE(1..maxNrofMultiplePUSCHs-r16))
OF PUSCH-Allocation-r16,
...
}
PUSCH-Allocation-r 16:: =SEQUENCE {
mappingType-r16 ENUMERATED {typeA, typeB} OPTIONAL, -- Cond
NotFormat01-02-Or-TypeA
startSymbolAndLength-r16 INTEGER (0.. 127) OPTIONAL, -- Cond
NotFormat01-02-Or-TypeA
startSymbol-r16 INTEGER (0.. 13) OPTIONAL, -- Cond RepTypeB
length-r16 INTEGER (1.. 14) OPTIONAL, -- Cond RepTypeB
numberOfRepetitions-r16 ENUMERATED {n1, n2, n3, n4, n7, n8, n12, n16}
OPTIONAL, -- Cond Format01-02
...
}
```

In the embodiment, the numberOfRepetitions-r16 is used to indicate the repeated transmission times K of the PUSCH, and startSymbolAndLength is used to indicate the start symbol S and the length L of the PUSCH.

In some embodiments, the terminal device determines the time domain resources used for PUSCH retransmission according to the above information and the PUSCH repetition Type determined through high-layer signaling.

For example, for PUSCH repetition Type A, the terminal device repeatedly transmits the same transport block in K consecutive time slots. The symbol allocation in each time slot is the same, that is, the symbol allocation in the time slot indicated by startSymbolAndLength.

For another example, for PUSCH repetition Type B, for the nth PUSCH transmission, n=0, . . . , numberOfRepetitions−1:

The time slot where the PUSCH transmission start position is located is $$K_s + \left\lfloor \frac{S + n \cdot L}{N_{symb}^{slot}} \right\rfloor,$$

and the PUSCH start symbol relative to the start position of the time slot is $$\mathrm{mod}\left(S + n \cdot L,\ N_{symb}^{slot}\right);$$

The time slot where the PUSCH transmission end position is located is $$K_s + \left\lfloor \frac{S + (n+1) \cdot L - 1}{N_{symb}^{slot}} \right\rfloor,$$

and the PUSCH end symbol relative to the start position of the time slot is $$\mathrm{mod}\left(S + (n+1) \cdot L - 1,\ N_{symb}^{slot}\right).$$

In the embodiment, $K_s$ is the time slot where the PUSCH repeated transmission starts, and $$N_{symb}^{slot}$$

is the number of symbols contained in each time slot.

That is to say, for PUSCH repetition Type B, K transmissions of PUSCH start at symbol S of the time slot, and $K_s$ are transmitted on consecutive K*L symbols, and each transmission contains L symbols.

In some embodiments, the PUSCH-TimeDomainResourceAllocationList-r17 may also include the information exemplified in the PUSCH-TimeDomainResourceAllocationList-r16.

Optionally, in some embodiments of the present application, the method 300 further includes:

S302, the terminal device receives the uplink grant sent by the network device.

In some embodiments, the uplink grant is an uplink grant in a random access response RAR, and the uplink grant is used to schedule retransmission of the PUSCH.

In some other embodiments, the uplink grant is an uplink grant in downlink control information DCI, and the DCI is used to schedule retransmission of the PUSCH.

In some embodiments of this application, S310 may include:

The terminal device determines the information on the number of repeated transmission times of the PUSCH according to the PUSCH common configuration information and the uplink grant sent by the network device.

In some embodiments, the uplink grant includes first indication information, and the first indication information is used to indicate target information on the number of repeated transmission times in the PUSCH common configuration information.

For example, if the PUSCH common configuration information includes a plurality of pieces of information on the number of repeated transmission times for Msg3 PUSCH, the network device may use the first indication information to indicate the target information on the number of repeated transmission times in the multiple pieces of information on the repeated times, for example, by the means of a bitmap.

For another example, if the PUSCH common configuration information includes a plurality of time domain resource allocation configurations, and each time domain resource allocation configuration corresponds to the corresponding information on the number of repeated transmission times of the PUSCH, the network device may indicate the target time domain resource allocation configuration in the multiple time domain resource allocation configurations by the first indication information, for example, by the means of a bitmap.

In some embodiments, the time domain resource allocation information and the information on the number of repeated transmission times of the PUSCH may be associated. For example, the time domain resource allocation information and the associated number of repeated transmissions of the PUSCH form a time domain resource allocation configuration, which corresponds to a time domain resource allocation configuration index. In this case, target time domain resource allocation information and information on the number of repeated transmission times of the PUSCH can be indicated by an indication information (for example, the time domain resource allocation configuration index).

In some other embodiments, the time domain resource allocation information and the information on the number of repeated transmission times of the PUSCH are independent. In this case, the time domain resource allocation information for Msg3 PUSCH transmission and the information on the number of repeated transmission times of the Msg3 PUSCH can be indicated respectively by corresponding indication information.

For example, in the foregoing embodiments, the PUSCH common configuration information may include a first repeated transmission number information set, and if the first repeated transmission number information set includes multiple numbers of repeated transmission times, the first information may include a first bitmap, and the first bitmap can be used to indicate the target information on the number of repeated transmission times in the first repeated transmission number information set.

For another example, in the foregoing embodiments, the PUSCH common configuration information includes a second repeated transmission number information set, if the second repeated transmission number information set includes multiple numbers of repeated transmission times, in the PUSCH initial transmission scenario, the first information may include a second bitmap, and the second bitmap can be used to indicate the target information on the number of repeated transmission times in the second repeated transmission number information set.

For another example, in the foregoing embodiments, the PUSCH common configuration information includes a third repeated transmission number information set, if the third repeated transmission number information set includes multiple numbers of repeated transmission times, in the PUSCH retransmission scenario, the first information may include a third bitmap, and the third bitmap can be used to indicate the target information on the number of repeated transmission times in the third repeated transmission number information set.

In some other embodiments of the present application, an IE of the PUSCH common configuration information includes the information on the number of repeated transmission times of the PUSCH. In this case, the information on the number of repeated transmission times of the PUSCH may be the information on the number of repeated transmission times for all terminal devices in the cell, that is, the information on the number of repeated transmission times of the PUSCH is the cell-level information on the number of repeated transmission times of the Msg3 PUSCH.

In some embodiments, an IE may be added in the pusch-ConfigCommon to indicate the cell-level information on the number of repeated transmission times of the Msg3 PUS CH.

As an example, the format of the PUSCH-ConfigCommon information element is as follows:

```
-- ASN1START
-- TAG-PUSCH-CONFIGCOMMON-START
PUSCH- ConfigCommon::= SEQUENCE {
groupHoppingEnabledTransformPrecoding ENUMERATED {enabled}
OPTIONAL, -- Need R
pusch-TimeDomainAllocationList PUSCH-TimeDomainResourceAllocationList
OPTIONAL, -- Need R
OPTIONAL, -- Need R
msg3-DeltaPreamble INTEGER (− 1.. 6) OPTIONAL, -- Need R
p0-NominalWithGrant INTEGER (− 202.. 24) OPTIONAL, -- Need R
Msg3-numberOfRepetitions-r17 ENUMERATED {n1, n2, n3, n4, n7, n8, n12,
n16} OPTIONAL, --Cond
...
}
```

In the embodiment, the Msg3-numberOfRepetitions-r17 may be used to indicate the cell-level repeated transmission times of the Msg3 PUSCH.

In some embodiments, the cell-level information on the number of repeated transmission times of the Msg3 PUSCH may include a fourth repeated transmission number information set, and the fourth repeated transmission number information set may include at least one piece of information on the number of repeated transmission times of the Msg3 PUS CH.

Optionally, the fourth repeated transmission number information set may be used for the initial transmission and retransmission of the Msg3 PUSCH.

Optionally, if the fourth repeated transmission number information set includes multiple pieces of information on the number of repeated transmission times, the network device may indicate to the terminal device the target information on the number of repeated transmission times in the fourth repeated transmission number information set.

For example, the network device may send an uplink grant to the terminal device, wherein the uplink grant includes third indication information, and wherein the third indication information is used to indicate the target information on the number of repeated transmission times in the fourth repeated transmission number information set.

In some other embodiments, the cell-level information on the number of repeated transmission times of the Msg3 PUSCH may include a fifth repeated transmission number information set and a sixth repeated transmission number information set, and the fifth repeated transmission number information set includes at least one piece of information on the number of repeated transmission times of the initial transmission of the Msg3 PUSCH, the sixth repeated transmission number information set includes at least one piece of information on the number of repeated transmission times of the retransmission of the Msg3 PUSCH.

Optionally, the information on the number of repeated transmission times used for the initial transmission of the Msg3 PUSCH and the information on the number of repeated transmission times used for the retransmission of the Msg3 PUSCH may be the same, or may also be different.

Optionally, if the fifth repeated transmission number information set includes multiple pieces of information on the number of repeated transmission times, the network device may indicate to the terminal device the target information on the number of repeated transmission times in the fifth repeated transmission number information set.

For example, in the Msg3 PUSCH initial transmission scenario, the network device may send an uplink grant to the terminal device, the uplink grant includes fourth indication information, and the fourth indication information is used to indicate the target information on the number of repeated transmission times in the fifth repeated transmission number information set.

Optionally, if the sixth repeated transmission number information set includes multiple pieces of information on the number of repeated transmission times, the network device may indicate to the terminal device the target information on the number of repeated transmission times in the sixth repeated transmission number information set.

For example, in the Msg 3 PUSCH retransmission scenario, the network device may send an uplink grant to the terminal device, the uplink grant includes fifth indication information, and the fifth indication information is used to indicate the target information on the number of repeated transmission times in the sixth repeated transmission number information set.

In some embodiments of the present application, when the PUSCH common configuration information does not include the information on the number of repeated transmission times of the PUSCH, the terminal device may determine the information on the number of repeated transmission times of the Msg 3 PUSCH according to the time domain resource allocation list. For example, when the PUSCH common configuration information does not include the PUSCH time domain resource allocation list IE, the terminal device may determine the information on the number of repeated transmission times of Msg3 PUSCH according to the time domain resource allocation list.

In some embodiments of the present application, the time domain resource allocation list is a default PUSCH time domain resource allocation list (time domain resource allocation), and the default PUSCH time domain resource allocation list (default PUSCH time domain resource allocation) includes multiple time domain resource allocation configurations, and each time domain resource allocation configuration includes a set of time domain resource allocation information and information on the number of repeated transmission times of the PUS CH.

Optionally, each set of time domain resource allocation information may include at least one of the following information:

k2, the mapping type, start symbol, and length of the PUSCH, wherein k2 represents the number of slots offset between the time slot where the signaling for scheduling the PUSCH is located and the slot where the PUSCH is located.

In some embodiments, each time domain resource allocation configuration includes one piece of information on the number of repeated transmission times, and the one piece of information on the number of repeated transmission times is used for the initial transmission and retransmission of the Msg3 PUSCH.

In some other embodiments, each time domain resource allocation configuration includes two pieces of information on the number of repeated transmission times, and the two pieces of information on the number of repeated transmission times are respectively used for the initial transmission and retransmission of the Msg3 PUSCH.

In some embodiments, the number of repeated transmission times of the PUSCH corresponding to each time domain resource allocation configuration is predefined or configured by the network device.

As an example, the number of repeated transmission times of the PUSCH included in each time domain resource allocation configuration is configured through radio resource control RRC signaling or system information. For example, configured through the pusch-ConfigCommon configuration.

In some embodiments, the time domain resource allocation list is used for all terminal devices.

Alternatively, the time domain resource allocation list is a dedicated list for the terminal device that supports repeated transmission of the PUSCH.

In some embodiments, the network device may send second indication information to the terminal device, wherein the second indication information is used to indicate a target time domain resource allocation configuration in the multiple time domain resource allocation configurations.

Optionally, the second indication information is included in the uplink grant.

In some embodiments, each time domain resource allocation configuration corresponds to a time domain resource allocation configuration index, and the second indication information may be used to indicate the index corresponding to the target time domain resource allocation configuration.

As an example, default PUSCH time domain resource allocation is shown in Table 2.

TABLE 2

| row number | PUSCH mapping type | K2 | S | L | information of number of repeated transmission times |
|---|---|---|---|---|---|
| 1 | Type A | j | 0 | 14 | 2 |
| 2 | Type A | j | 0 | 12 | 4 |
| 3 | Type A | j | 0 | 10 | 8 |
| 4 | Type B | j | 2 | 10 | 4 |
| 5 | Type B | j | 4 | 10 | 8 |
| 6 | Type B | j | 4 | 8 | 16 |
| 7 | Type B | j | 4 | 6 | 32 |
| 8 | Type A | j + 1 | 0 | 14 | 2 |
| 9 | Type A | j + 1 | 0 | 12 | 4 |
| 10 | Type A | j + 1 | 0 | 10 | 8 |
| 11 | Type A | j + 2 | 0 | 14 | 2 |

TABLE 2-continued

| row number | PUSCH mapping type | K2 | S | L | information of number of repeated transmission times |
|---|---|---|---|---|---|
| 12 | Type A | j + 2 | 0 | 12 | 4 |
| 13 | Type A | j + 2 | 0 | 10 | 8 |
| 14 | Type B | j | 8 | 6 | 32 |
| 15 | Type A | j + 3 | 0 | 14 | 2 |
| 16 | Type A | j + 3 | 0 | 10 | 4 |

In the example in Table 2, each row has a time domain resource allocation configuration, a time domain resource allocation configuration corresponds to a row number, and the second indication information may be used to indicate the row number corresponding to the target time domain resource allocation configuration.

In some embodiments of the present application, the time domain resource allocation information and the information on the number of repeated transmission times of the PUSCH may be carried in a table. In this case, the time domain resource allocation information and the information on the number of repeated transmission times of the PUSCH may have an association relationship, the time domain resource allocation information and the associated number of repeated transmission times of the PUSCH can be considered as a time domain resource allocation configuration, corresponding to a time domain resource allocation configuration index. In this case, the target time domain resource allocation information and information on the number of repeated transmission times for the transmission of the PUSCH can be indicated by one piece of indication information (for example, the time domain resource allocation configuration index).

In other embodiments of the present application, the time domain resource allocation information and the information on the number of repeated transmission times of the PUSCH may be carried in corresponding tables respectively. In this case, the time domain resource allocation information and the information on the number of repeated transmission times of the PUSCH may be associated, or independent.

For example, the time domain resource allocation configuration corresponds to the default PUSCH time domain resource allocation list, and the information on the number of repeated transmission times of the PUSCH corresponds to the PUSCH repeated transmission number list. The PUSCH repeated transmission number list may include at least one piece of information on the number of repeated transmission times, and the network device may indicate the target time domain resource allocation information and target information on the number of repeated transmission times for the PUSCH transmission through corresponding indication information.

For another example, the PUSCH repeated transmission number list may include multiple sets of PUSCH repeated transmission number configurations, and each set of PUSCH repeated transmission number configuration includes information on the number of repeated transmission times corresponding to each set of time domain resource allocation information. The network device can activate a set of PUSCH repeated transmission number configurations in the multiple sets of PUSCH repeated transmission number configurations through signaling (such as RRC signaling or DCI). The network device indicates the target time domain resource allocation information in the default PUSCH time domain resource allocation list, relative to indicating that the information on the number of repeated transmission times corresponding to the target time domain resource allocation information in the activated set of PUSCH repeated transmission number configurations is the target information on the number of repeated transmission times.

For example, the PUSCH repeated transmission number list may include M sets of PUSCH repeated transmission number configurations, each set of PUSCH repeated transmission number configurations includes 16 pieces of information on the number of repeated transmission times of the PUSCH, and the 16 pieces of information on the number of repeated transmission times of the PUSCH are in one-to-one correspondence with the 16 rows of time domain resource allocation information in Table 2, each of the information on the number of repeated transmission times of the PUSCH can be used for the initial transmission and retransmission of the PUSCH. Alternatively, each row of time domain resource allocation information may also correspond to two pieces of information on the number of repeated transmission times of the PUSCH, which are respectively used for initial transmission and retransmission of the PUSCH, and the present application is not limited thereto.

The network device may indicate the activated PUSCH repeated transmission number configuration in the M sets of PUSCH repeated transmission number configurations, for example, activate the first set of PUSCH repeated transmission number configuration. In this case, the terminal device may determine the target number of repeated transmission times of the PUSCH according to the first set of repeated transmission number configuration. For example, the network device may send an uplink grant to the terminal device, and the uplink grant may include sixth indication information for indicating the target number of repeated transmission times of the PUSCH in the first set of PUSCH repeated transmission number configurations, for example, through the means of a bitmap mode. Alternatively, the sixth indication information is used to indicate the target time domain resource allocation information in the default PUSCH time domain resource allocation list, in this case, the terminal device can determine the number of repeated transmission times in the set of repeated transmission number configuration corresponding to the target time domain resource allocation information as the target information on the number of repeated transmission times.

To sum up, the terminal device can determine the number of repeated transmission times of the PUSCH used to carry Msg3 according to the PUSCH common configuration information or the time domain resource allocation list, or, more specifically, can determine the information on the number of repeated transmission times for the initial transmission of the Msg3 PUSCH in the initial transmission scenario of the Msg3 PUSCH, and determine the information on the number of repeated transmission times for the retransmission of Msg3 PUSCH in the retransmission scenario of the Msg3 PUSCH, so as to realize the repeated transmission of the PUSCH carrying the Msg3, thereby improving the transmission reliability of the Msg3.

The method embodiment of the present application is described in detail above in conjunction with FIG. 3, and the device embodiment of the present application is described in detail below in conjunction with FIG. 4 to FIG. 7. It should be understood that the device embodiment and the method embodiment correspond to each other, and similar descriptions can refer to the method embodiment.

Figure 4:
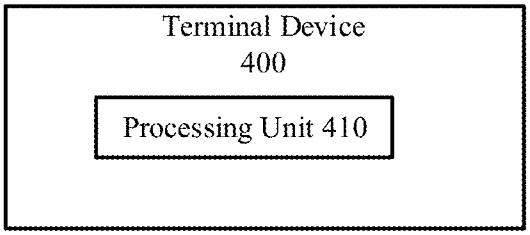
FIG. 4 is a schematic block diagram of a terminal device provided according to an embodiment of the present application.

FIG. 4 shows a schematic block diagram of a terminal device 400 according to an embodiment of the present application. As shown in FIG. 4, the terminal device 400 includes:

a processing unit 410, configured to determine information on a number of repeated transmission times of a physical uplink shared channel PUSCH according to PUSCH common configuration information or a time domain resource allocation list, wherein the PUSCH is used to carry a third message in a random access process.

In some embodiments of the present disclosure, the PUSCH common configuration information includes a PUSCH time domain resource allocation list information element IE, and the PUSCH time domain resource allocation list IE includes the information on the number of repeated transmission times of the PUSCH.

In some embodiments of the present disclosure, the PUSCH time domain resource allocation list IE includes a plurality of time domain resource allocation configurations, and each time domain resource allocation configuration includes a set of time domain resource allocation information and the information on the number of repeated transmission times of the PUS CH.

In some embodiments of the present disclosure, each of the time domain resource allocation configurations includes one piece of information on the number of repeated transmission times, and the one piece of information on the number of repeated transmission times is used for initial transmission and retransmission of the PUSCH; or each of the time domain resource allocation configurations includes two pieces of information on the number of repeated transmission times, and the two pieces of information on the number of repeated transmission times are respectively used for the initial transmission and retransmission of the PUSCH.

In some embodiments of the present disclosure, the processing unit 410 is further configured to:

determine the information on the number of repeated transmission times of the PUSCH according to the PUSCH common configuration information and an uplink grant sent by a network device, wherein the uplink grant includes first indication information, and the first indication information is configured to indicate a target time domain resource allocation configuration among the plurality of time domain resource allocation configurations.

In some embodiments of the present disclosure, an IE of the PUSCH common configuration information includes the information on the number of repeated transmission times of the PUSCH.

In some embodiments of the present disclosure, the IE of the PUSCH common configuration information includes a set of information on the number of repeated transmission times, and the set of information on the number of repeated transmission times is used for initial transmission and retransmission of the PUSCH; or the IE of the PUSCH common configuration information includes two sets of information on the number of repeated transmission times, and the two sets of information on the number of repeated transmission times are respectively used for the initial transmission and retransmission of the PUSCH.

In some embodiments of the present disclosure, the time domain resource allocation list is a default PUSCH time domain resource allocation list, and the default PUSCH time domain resource allocation list includes a plurality of time domain resource allocation configurations, each time domain resource allocation configuration includes a set of time domain resource allocation information and information on the number of repeated transmission times of the PUSCH.

In some embodiments of the present disclosure, each of the time domain resource allocation configurations includes one piece of information on the number of repeated transmission times, and the information on the number of repeated transmission times is used for initial transmission and retransmission of the PUSCH; or each of the time domain resource allocation configurations includes two pieces of information on the number of repeated transmission times, and the two pieces of information on the number of repeated transmission times are respectively used for the initial transmission and retransmission of the PUSCH.

In some embodiments of the present disclosure, the number of repeated transmission times of the PUSCH included in each time domain resource allocation configuration is predefined or configured by a network device.

In some embodiments of the present disclosure, the number of repeated transmission times of the PUSCH included in each time domain resource allocation configuration is configured through a radio resource control RRC signaling or system information.

In some embodiments of the present disclosure, the time domain resource allocation list is configured for all terminal devices; or, the time domain resource allocation list is a dedicated list for the terminal device that support repeated transmission of the PUSCH.

In some embodiments of the present disclosure, the processing unit 410 is further configured to:

determine the information on the number of repeated transmission times of the PUSCH according to the time domain resource allocation list and an uplink grant sent by a network device, wherein the uplink grant includes second indication information, and the second indication information is configured to indicate a target time domain resource allocation configuration among the plurality of time domain resource allocation configurations.

In some embodiments of the present disclosure, the uplink grant is an uplink grant in a random access response RAR, or the uplink grant is an uplink grant in downlink control information DCI, wherein the DCI is used to schedule retransmission of the PUSCH.

Optionally, in some embodiments, the above-mentioned communication unit may be a communication interface or a transceiver, or an input-output interface of a communication chip or a system on chip. The aforementioned processing unit may be one or more processors.

It should be understood that the terminal device 400 according to the embodiment of the present application may correspond to the terminal device in the method embodiment of the present application, and the above-mentioned and other operations and/or functions of each unit in the terminal device 400 are for realizing corresponding process of the terminal device in the method 300 shown in FIG. 3. For the sake of brevity, it will not be repeated here.

Figure 5:
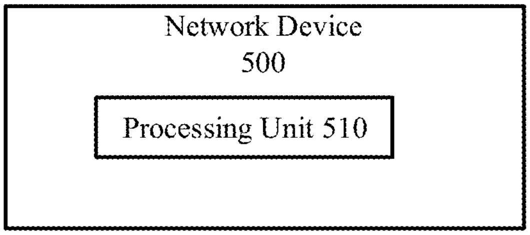
FIG. 5 is a schematic block diagram of a network device provided according to an embodiment of the present application.

FIG. 5 is a schematic block diagram of a network device according to an embodiment of the present application. The network device 500 of FIG. 5 includes:

a processing unit 510, configured to configuring, by a network device, information on a number of repeated transmission times of a physical uplink shared channel PUSCH for a terminal device, according to PUSCH common configuration information or a time domain resource allocation list, wherein the PUSCH is used to carry a third message in a random access process.

In some embodiments of the present disclosure, the PUSCH common configuration information includes a PUSCH time domain resource allocation list information element IE, and the PUSCH time domain resource allocation list IE includes the information on the number of repeated transmission times of the PUSCH.

In some embodiments of the present disclosure, the PUS CH time domain resource allocation list IE includes a plurality of time domain resource allocation configurations, and each time domain resource allocation configuration includes a set of time domain resource allocation information and the information on the number of repeated transmission times of the PUSCH.

In some embodiments of the present disclosure, each of the time domain resource allocation configurations includes one piece of information on the number of repeated transmission times, and the one piece of information on the number of repeated transmission times is used for initial transmission and retransmission of the PUSCH; or each of the time domain resource allocation configurations includes two pieces of information on the number of repeated transmission times, and the two pieces of information on the number of repeated transmission times are respectively used for the initial transmission and retransmission of the PUSCH.

In some embodiments of the present disclosure, the network device 500 further includes:

a communication unit, configured to send an uplink grant to the terminal device, wherein the uplink grant includes first indication information, and the first indication information is configured to indicate a target time domain resource allocation configuration among the plurality of time domain resource allocation configurations.

In some embodiments of the present disclosure, an IE of the PUSCH common configuration information includes the information on the number of repeated transmission times of the PUSCH.

In some embodiments of the present disclosure, the IE of the PUSCH common configuration information includes a set of information on the number of repeated transmission times, and the set of information on the number of repeated transmission times is used for initial transmission and retransmission of the PUSCH; or the IE of the PUSCH common configuration information includes two sets of information on the number of repeated transmission times, and the two sets of information on the number of repeated transmission times are respectively used for the initial transmission and retransmission of the PUSCH.

In some embodiments of the present disclosure, the time domain resource allocation list is a default PUSCH time domain resource allocation list, and the default PUSCH time domain resource allocation list includes a plurality of time domain resource allocation configurations, each time domain resource allocation configuration includes a set of time domain resource allocation information and information on the number of repeated transmission times of the PUSCH.

In some embodiments of the present disclosure, each of the time domain resource allocation configurations includes one piece of information on the number of repeated transmission times, and the information on the number of repeated transmission times is used for initial transmission and retransmission of the PUSCH; or each of the time domain resource allocation configurations includes two pieces of information on the number of repeated transmission times, and the two pieces of information on the number of repeated transmission times are respectively used for the initial transmission and retransmission of the PUSCH.

In some embodiments of the present disclosure, the number of repeated transmission times of the PUSCH includes in each time domain resource allocation configuration is predefined or configured by the network device.

In some embodiments of the present disclosure, the number of repeated transmission times of the PUSCH included in each time domain resource allocation configuration is configured through a radio resource control RRC signaling or system information.

In some embodiments of the present disclosure, the time domain resource allocation list is configured for all terminal devices; or, the time domain resource allocation list is a dedicated list for the terminal device that support repeated transmission of the PUSCH.

In some embodiments of the present disclosure, the network device further includes:

a communication unit, configured to send an uplink grant to the terminal device, wherein the uplink grant includes second indication information, and the second indication information is configured to indicate a target time domain resource allocation configuration among the plurality of time domain resource allocation configurations.

In some embodiments of the present disclosure, the uplink grant is an uplink grant in a random access response RAR, or the uplink grant is an uplink grant in downlink control information DCI, wherein the DCI is used to schedule retransmission of the PUSCH.

Optionally, in some embodiments, the above-mentioned communication unit may be a communication interface or a transceiver, or an input-output interface of a communication chip or a system-on-chip. The aforementioned processing unit may be one or more processors.

It should be understood that the network device 500 according to the embodiment of the present application may correspond to the network device in the method embodiment of the present application, and the above-mentioned and other operations and/or functions of each unit in the network device 500 are to realize the corresponding processes of the network devices in the method 300 shown in FIG. 3 For the sake of brevity, it will not be repeated here.

Figure 6:
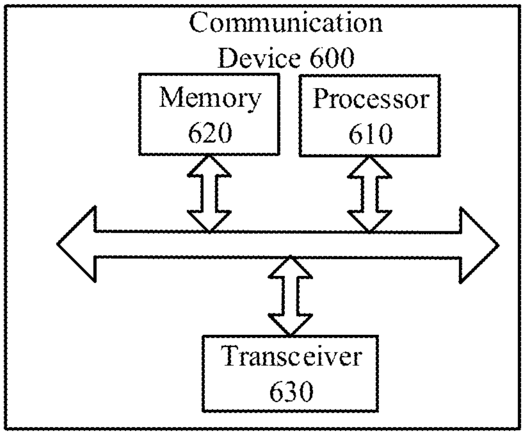
FIG. 6 is a schematic block diagram of a communication device provided according to an embodiment of the present application.

FIG. 6 is a schematic structural diagram of a communication device 600 provided by an embodiment of the present application. The communication device 600 shown in FIG. 6 includes a processor 610, and the processor 610 can invoke and run a computer program from a memory, so as to implement the method in the embodiment of the present application.

Optionally, as shown in FIG. 6, the communication device 600 may further include a memory 620. Wherein, the processor 610 can invoke and run a computer program from the memory 620, so as to implement the method in the embodiment of the present application.

The memory 620 may be an independent device independent of the processor 610, or may be integrated in the processor 610.

Optionally, as shown in FIG. 6, the communication device 600 may further include a transceiver 630, and the processor 610 may control the transceiver 630 to communicate with other devices, specifically, to send information or data to other devices, or receive information or data sent by other devices.

The transceiver 630 may include a transmitter and a receiver. The transceiver 630 may further include an antenna (s), and the number of the antenna may be one or more.

Optionally, the communication device 600 may be the network device of the embodiment of the present application, and the communication device 600 may implement the corresponding processes implemented by the network device in the methods of the embodiment of the present application. For the sake of brevity, it will not be repeated herein.

Optionally, the communication device 600 may be the mobile terminal/terminal device, and the communication device 600 may implement the corresponding processes implemented by the method provided by mobile terminal/terminal device in the embodiments of the present application. For the sake of brevity, it will not be repeated herein.

Figure 7:
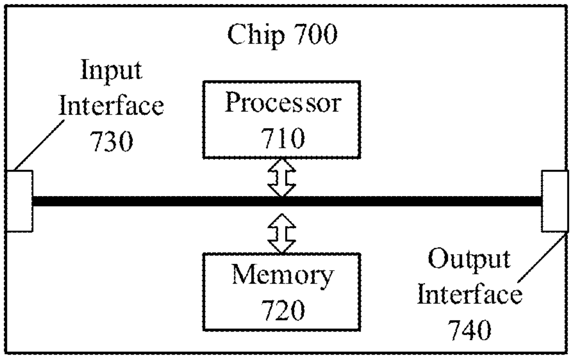
FIG. 7 is a schematic block diagram of a chip provided according to an embodiment of the present application.

FIG. 7 is a schematic structural diagram of a chip 700 according to an embodiment of the present application. The chip 700 shown in FIG. 7 includes a processor 710, and the processor 710 can invoke and run a computer program from a memory, so as to implement the method in the embodiment of the present application.

Optionally, as shown in FIG. 7, the chip 700 may further include a memory 720. The processor 710 may invoke and run a computer program from the memory 720, so as to implement the method in the embodiment of the present application.

The memory 720 may be an independent device independent of the processor 710, or may be integrated in the processor 710.

Optionally, the chip 700 may also include an input interface 730. The processor 710 can control the input interface 730 to communicate with other devices or chips, specifically, can obtain information or data sent by other devices or chips.

Optionally, the chip 700 may also include an output interface 740. The processor 710 can control the output interface 740 to communicate with other devices or chips, specifically, can output information or data to other devices or chips.

Optionally, the chip can be applied to the network device in the embodiments of the present application, and the chip can implement the corresponding processes implemented by the network device in the methods of the embodiments of the present application. For the sake of brevity, it will not be repeated herein.

Optionally, the chip can be applied to the mobile terminal/terminal device, and the chip can implement the corresponding processes implemented by the mobile terminal/terminal device in the methods of the embodiments of the present application. For the sake of brevity, it will not be repeated herein.

It should be understood that the chip mentioned in the embodiment of the present application may also be referred to as a system level chip, a system chip, a chip system or a system-on-chip.

Figure 8:
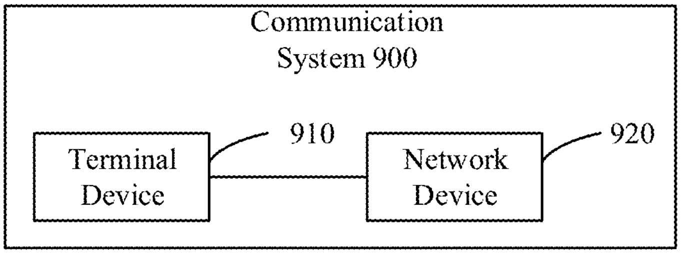
FIG. 8 is a schematic block diagram of a communication system provided according to an embodiment of the present application.

FIG. 8 is a schematic block diagram of a communication system 900 provided by an embodiment of the present application. As shown in FIG. 8, the communication system 900 includes a terminal device 910 and a network device 920.

The terminal device 910 can be used to realize the corresponding functions realized by the terminal device in the above method, and the network device 920 can be used to realize the corresponding functions realized by the network device in the above method. For the sake of brevity, it will not be repeated herein.

It should be understood that the processor in the embodiment of the present application may be an integrated circuit chip, which has a signal processing capability. In the implementation process, each step of the above-mentioned method embodiments may be completed by an integrated logic circuit of hardware in a processor or instructions in the form of software. The above-mentioned processor may be a general-purpose processor, a digital signal processor (DSP), an application specific integrated circuit (ASIC), a field programmable gate array (FPGA) or other programmable logic devices, discrete gate or transistor logic devices, discrete hardware components. Various methods, steps, and logic block diagrams disclosed in the embodiments of the present application may be implemented or executed. The general-purpose processor may be a microprocessor, or the processor may be any conventional processor, or the like. The steps of the method disclosed in connection with the embodiments of the present application may be directly implemented by a hardware decoding processor, or implemented by a combination of hardware and software modules in the decoding processor. The software module can be located in a mature storage medium in the field such as random access memory, flash memory, read-only memory, programmable read-only memory or electrically erasable programmable memory, or register. The storage medium is located in the memory, and the processor reads the information in the memory, and completes the steps of the above method in combination with its hardware.

It can be understood that the memory in the embodiments of the present application may be a volatile memory or a nonvolatile memory, or may include both volatile and non-volatile memories. Among them, the non-volatile memory can be read-only memory (ROM), programmable read-only memory (PROM), erasable programmable read-only memory (Erasable PROM, EPROM), electrically programmable Erase Programmable Read-Only Memory (Electrically EPROM, EEPROM) or Flash. The volatile memory may be Random Access Memory (RAM), which acts as an external cache. By way of illustration and not limitation, many forms of RAM are available such as Static RAM (SRAM), Dynamic RAM (DRAM), Synchronous DRAM (SDRAM), double data rate synchronous dynamic random access memory (Double Data Rate SDRAM, DDR SDRAM), enhanced synchronous dynamic random access memory (Enhanced SDRAM, ESDRAM), synchronous connection dynamic random access memory (Synchlink DRAM, SLDRAM) and Direct Memory Bus Random Access Memory (Direct Rambus RAM, DR RAM). It should be noted that the memory of the systems and methods described herein is intended to include, but not be limited to, these and any other suitable types of memory.

It should be understood that the above-mentioned memory is illustrative but not restrictive. For example, the memory in the embodiment of the present application may also be a static random access memory (static RAM, SRAM), a dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), etc. That is, the memory in the embodiments of the present application is intended to include, but not be limited to, these and any other suitable types of memory.

The embodiment of the present application also provides a computer-readable storage medium for storing computer programs.

Optionally, the computer-readable storage medium can be applied to the network device in the embodiments of the present application, and the computer program enables the computer to execute the corresponding processes implemented by the network device in the methods of the embodiments of the present application. For brevity, it will not be repeated herein.

Optionally, the computer-readable storage medium can be applied to the mobile terminal/terminal device in the embodiments of the present application, and the computer program enables the computer to execute the corresponding processes implemented by the mobile terminal/terminal device in the various methods of the embodiments of the present application, for the sake of brevity, it is not repeated here.

The embodiment of the present application also provides a computer program product, including computer program instructions.

Optionally, the computer program product may be applied to the network device in the embodiment of the present application, and the computer program instructions cause the computer to execute the corresponding process implemented by the network device in each method of the embodiment of the present application. For the sake of brevity, the details are not repeated here.

Optionally, the computer program product can be applied to the mobile terminal/terminal device in the embodiments of the present application, and the computer program instructions cause the computer to execute the corresponding processes implemented by the mobile terminal/terminal device in the methods of the embodiments of the present application, For the sake of brevity, details are not repeated here.

The embodiment of the present application also provides a computer program.

Optionally, the computer program can be applied to the network device in the embodiment of the present application. When the computer program is run on the computer, the computer executes the corresponding process implemented by the network device in each method of the embodiment of the present application. For the sake of brevity, it will not be repeated here.

Optionally, the computer program can be applied to the mobile terminal/terminal device in the embodiment of the present application. When the computer program is run on the computer, the computer executes each method in the embodiment of the present application to be implemented by the mobile terminal/terminal device. For the sake of brevity, the corresponding process will not be repeated here.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Those skilled in the art may use different methods to implement the described functions for each specific application, but such implementation should not be regarded as exceeding the scope of the present application.

Those skilled in the art can clearly understand that for the convenience and brevity of the description, the specific operating process of the above-described system, device and unit can refer to the corresponding process in the foregoing method embodiment, which will not be repeated here.

In the several embodiments provided in this application, it should be understood that the disclosed systems, devices and methods may be implemented in other ways. For example, the device embodiments described above are only illustrative. For example, the division of the units is only a logical function division. In actual implementation, there may be other division methods. For example, multiple units or components can be combined or may be integrated into another system, or some features may be ignored, or not implemented. In another point, the mutual coupling or direct coupling or communication connection shown or discussed may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solution of this embodiment.

In addition, each functional unit in each embodiment of the present application may be integrated into one processing unit, each unit may exist separately physically, or two or more units may be integrated into one unit.

If the functions described above are realized in the form of software function units and sold or used as independent products, they can be stored in a computer-readable storage medium. Based on this understanding, the technical solution of the present application is essentially or the part that contributes to the prior art or the part of the technical solution can be embodied in the form of a software product, and the computer software product is stored in a storage medium, including several instructions that are used to make a computer device (which may be a personal computer, a server, or a network device, etc.) execute all or part of the steps of the methods described in the various embodiments of the present application. The aforementioned storage media include: U disk, mobile hard disk, read-only memory (ROM), random access memory (RAM), magnetic disk or optical disk and other media that can store program codes.

The above is only a specific implementation of the application, but the scope of protection of the application is not limited thereto. Anyone familiar with the technical field can easily think of changes or substitutions within the technical scope disclosed in the application. Should be covered within the protection scope of this application. Therefore, the protection scope of the present application should be based on the protection scope of the claims.

What is claimed is:

1. A method for data channel transmission, comprising:

determining, by a terminal device, information on a number of repeated transmission times of a physical uplink shared channel PUSCH according to PUSCH common configuration information, wherein the PUSCH is used to carry a third message in a random access process;

wherein the PUSCH common configuration information comprises a PUSCH time domain resource allocation list information element IE, and the PUSCH time domain resource allocation list IE comprises the information on the number of repeated transmission times of the PUSCH;

wherein the PUSCH time domain resource allocation list IE comprises a plurality of time domain resource allocation configurations, and each time domain resource allocation configuration comprises a set of time domain resource allocation information and the information on the number of repeated transmission times of the PUSCH; and wherein determining, by the terminal device, the information on the number of repeated transmission times of the PUSCH according to the PUSCH common configuration information comprises:

determining, by the terminal device, the information on the number of repeated transmission times of the PUSCH according to the PUSCH common configuration information and an uplink grant sent by a network device, wherein the uplink grant comprises first indication information, and the first indication information is configured to indicate a target time domain resource allocation configuration index among the plurality of time domain resource allocation configurations.

2. The method according to claim 1, wherein each of the time domain resource allocation configurations comprises one piece of information on the number of repeated transmission times, and the one piece of information on the number of repeated transmission times is used for initial transmission and retransmission of the PUSCH; or wherein each of the time domain resource allocation configurations comprises two pieces of information on the number of repeated transmission times, and the two pieces of information on the number of repeated transmission times are respectively used for the initial transmission and retransmission of the PUSCH.

3. The method according to claim 1, wherein the uplink grant is an uplink grant in a random access response RAR, or the uplink grant is an uplink grant in downlink control information DCI, wherein the DCI is used to schedule retransmission of the PUSCH.

4. A method for data channel transmission, comprising:

configuring, by a network device, information on a number of repeated transmission times of a physical uplink shared channel PUSCH for a terminal device, according to PUSCH common configuration information, wherein the PUSCH is used to carry a third message in a random access process;

wherein the PUSCH common configuration information comprises a PUSCH time domain resource allocation list information element IE, and the PUSCH time domain resource allocation list IE comprises the information on the number of repeated transmission times of the PUSCH;

wherein the PUSCH time domain resource allocation list IE comprises a plurality of time domain resource allocation configurations, and each time domain resource allocation configuration comprises a set of time domain resource allocation information and the information on the number of repeated transmission times of the PUSCH;

wherein the method further comprises:

sending, by the network device, an uplink grant to the terminal device, wherein the uplink grant comprises first indication information, and the first indication information is configured to indicate a target time domain resource allocation configuration index among the plurality of time domain resource allocation configurations.

5. The method according to claim 4, wherein each of the time domain resource allocation configurations comprises one piece of information on the number of repeated transmission times, and the one piece of information on the number of repeated transmission times is used for initial transmission and retransmission of the PUSCH; or wherein each of the time domain resource allocation configurations comprises two pieces of information on the number of repeated transmission times, and the two pieces of information on the number of repeated transmission times are respectively used for the initial transmission and retransmission of the PUSCH.

6. The method according to claim 4, wherein the uplink grant is an uplink grant in a random access response RAR, or the uplink grant is an uplink grant in downlink control information DCI, wherein the DCI is used to schedule retransmission of the PUSCH.

7. A terminal device, comprising:

a processor and a memory, the memory being configured to store a computer program, and the processor being configured to execute the computer program stored in the memory, to:

determine information on a number of repeated transmission times of a physical uplink shared channel PUSCH according to PUSCH common configuration information, wherein the PUSCH is used to carry a third message in a random access process;

wherein the PUSCH common configuration information comprises a PUSCH time domain resource allocation list information element IE, and the PUSCH time domain resource allocation list IE comprises the information on the number of repeated transmission times of the PUSCH;

wherein the PUSCH time domain resource allocation list IE comprises a plurality of time domain resource allocation configurations, and each time domain resource allocation configuration comprises a set of time domain resource allocation information and the information on the number of repeated transmission times of the PUSCH; and wherein the processor is further caused to:

determine the information on the number of repeated transmission times of the PUSCH according to the PUSCH common configuration information and an uplink grant sent by a network device, wherein the uplink grant comprises first indication information, and the first indication information is configured to indicate a target time domain resource allocation configuration index among the plurality of time domain resource allocation configurations.

8. A network device, comprising:

a processor and a memory, the memory being configured to store a computer program, and the processor being configured to execute the computer program stored in the memory, to:

configure information on a number of repeated transmission times of a physical uplink shared channel PUSCH for a terminal device, according to PUSCH common configuration information, wherein the PUSCH is used to carry a third message in a random access process;

wherein the PUSCH common configuration information comprises a PUSCH time domain resource allocation list information element IE, and the PUSCH time domain resource allocation list IE comprises the information on the number of repeated transmission times of the PUSCH;

wherein the PUSCH time domain resource allocation list IE comprises a plurality of time domain resource allocation configurations, and each time domain resource allocation configuration comprises a set of time domain resource allocation information and the information on the number of repeated transmission times of the PUSCH;

wherein the processor is further caused to:

send an uplink grant to the terminal device, wherein the uplink grant comprises first indication information, and the first indication information is configured to indicate a target time domain resource allocation configuration index among the plurality of time domain resource allocation configurations.

* * * * *